May 26, 1942. J. FERLA 2,283,921
APPARATUS FOR MOLDING PIPE
Filed Dec. 23, 1938 3 Sheets-Sheet 1

Inventor
John Ferla
By J. Preston Swecker
his Attorney

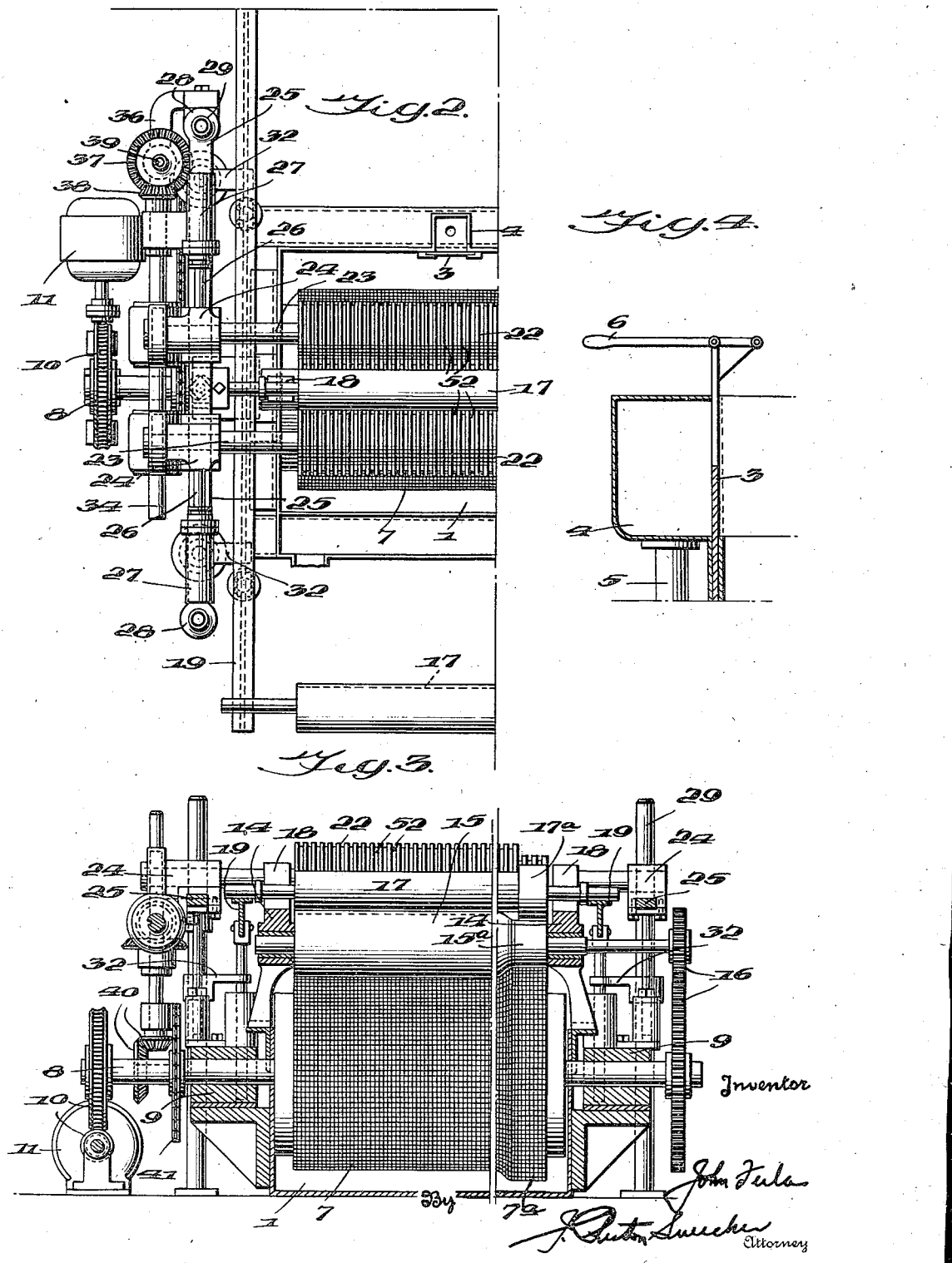

May 26, 1942. J. FERLA 2,283,921
APPARATUS FOR MOLDING PIPE
Filed Dec. 23, 1938 3 Sheets-Sheet 3
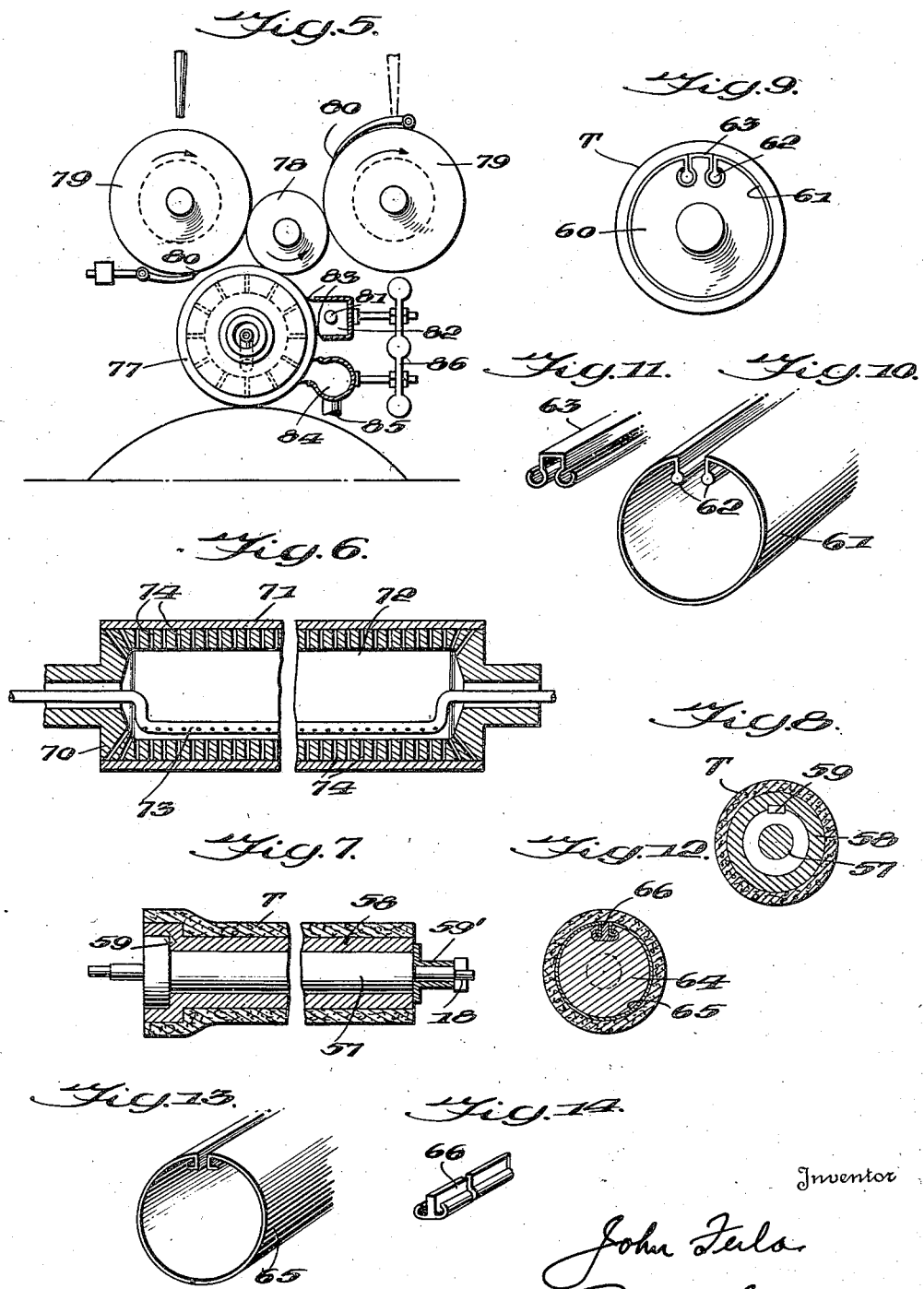

Patented May 26, 1942

2,283,921

UNITED STATES PATENT OFFICE 2,283,921

APPARATUS FOR MOLDING PIPE

John Ferla, Camden, N. J., assignor of one-fourth to Paul X. Blaettler, Oaklyn, N. J.

Application December 23, 1938, Serial No. 247,507

15 Claims. (Cl. 25—30)

This invention relates to an improvement in apparatus for producing composition pipes, and more particularly to the producing of such pipes from a composition preferably containing asbestos and cement.

The object of this invention is to improve the manner of forming composition tubes or pipes and the removal thereof from the apparatus at maximum speed without injury to the pipes during the removal. Provision is made for a quick transfer of the produced pipe after its formation is completed without injury to the surface thereof, and simultaneously with such removal of the formed pipe a new mandrel is introduced which replaces the mandrel thus removed, to resume the operation without appreciable loss of time.

Provision is made in the improved apparatus for opening the calender rolls to remove the filled mandrel from between the same and to insert an empty mandrel, fluid pressure being utilized for these movements to effect the proper separation whereby the filled mandrel may be readily removed from the machine and an empty mandrel inserted speedily and without injury to the formed tube. The driving connection for the calender rolls is not disturbed by this separating action, provision being made for maintaining this driving connection as the rolls are moved relative to each other.

Another object of the invention is to provide for a smooth and uniform flow of material to the calender roll or rolls so as to eliminate clogging and to maintain a uniform feed of the material.

Another object of the invention is to facilitate the removal of the tubes from the mandrels, to reduce the cost of the mandrels and to make it unnecessary to provide for a large number of mandrels per machine by the provision of a shell between the mandrel and formed tube which will maintain the shape of the tube during drying and allowing the mandrel to be returned to the machine for reuse. The shell is constructed so that it may be collapsed when the tube has dried sufficiently for ready separation therefrom.

In carrying out these objects, I have illustrated a preferred embodiment of this invention together with modifications thereof in the accompanying drawings, in which:

Fig. 2 is a partial top plan view thereof showing the drive for the calender rolls;

Fig. 3 is a vertical sectional view through the machine, partly in side elevation;

Fig. 4 is a detail vertical sectional view through an overflow for the tank;

Fig. 5 is an end elevation partly in section of a modified form of calender roll structure and suction mechanism;

Fig. 6 is a longitudinal sectional view through a fabric roll;

Fig. 7 is a longitudinal sectional view through a formed tube and shell showing the mandrel in side elevation;

Fig. 8 is a vertical sectional view therethrough;

Fig. 9 is an end elevation of a mandrel and tube showing a modification of the shell;

Fig. 10 is a detailed perspective view of an end portion of the shell detached;

Fig. 11 is a similar view of the locking piece therefor;

Fig. 12 is a vertical sectional view through a modified form of mandrel and shell;

Fig. 13 is a detailed perspective view of an end portion of the shell removed; and Fig. 14 is a similar view of the locking piece therefor.

Figure 1:
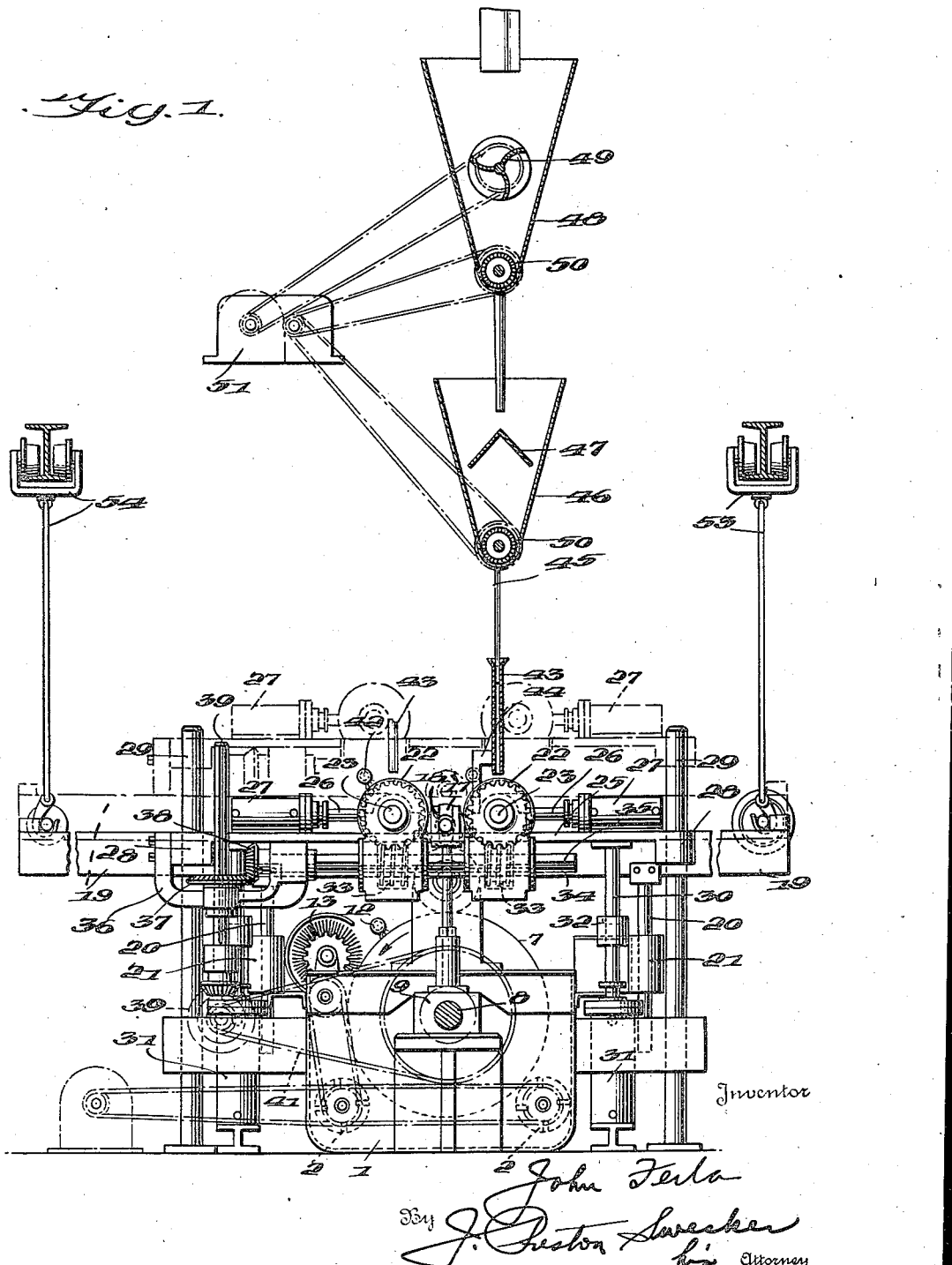
Fig. 1 is an end elevation of the apparatus.

While the invention is designed primarily for producing tubes from a composition of asbestos and cement, it is to be understood that it is not limited to such use but may produce tubes of any suitable composition or fibrous material.

In producing pipes or tubes from a composition, such as a mixture of asbestos and cement, such composition is introduced into a tank designated generally by the numeral 1 provided with agitators 2 operating in said tank to keep the material properly mixed and in solution. The height of the solution in the tank 1 may be regulated by a gate 3 (Fig. 4), the top of which forms an overflow from the tank 1 into a receptacle 4 connected by a pipe 5 with the source of supply for returning the overflow thereto. The gate 3 is controlled by a lever 6 which may be used to move the same up and down and thereby regulate and maintain fluid level of the material in the tank 1. In this way, the quantity of material in the tank may be kept at the proper and desired height for efficient operation.

Mounted in the tank 1 is a rotary screen mold 7 journaled on a shaft 8 within bearings 9. The shaft 8 is driven through gearing 10 from a motor or other source of power 11.

To prevent clogging of the reticulations of the screen mold 7, an air spray pipe 12 extends lengthwise thereof and is provided with perforations toward the periphery of the screen mold to direct thereagainst air jets which will tend to remove any material adhering in the reticulations. To facilitate this result, a rotary brush 13 is mounted so as to extend along the surface of the screen mold and bear thereagainst to remove therefrom any adhering particles of material.

Journaled in bearings 14 over the screen mold 7 is a fabric roll 15 having the periphery thereof substantially in bearing engagement with the periphery of the screen mold 7 for transferring a layer of composition material from the screen mold to the fabric roll as will be described hereafter. The fabric roll 15 is driven through gearing 16 from the shaft 8 of the screen mold which gearing is of proper ratio to provide for uniform and even surface speed of the screen mold and fabric roll.

Immediately over the fabric roll 15 is a mandrel 17 having its opposite reduced ends received in slotted bearings 18 open at the top for vertical movement of the mandrel in said bearings and removal therefrom. Normally the mandrel bears loosely by gravity on the periphery of the fabric roll 15 to receive therefrom successive layers of fibrous material in building up a tube or pipe on the mandrel. The opposite ends of the mandrel overlie T rails 19 constituting tracks, so as to be lifted from the bearings 18 thereby.

These T rails 19 have downwardly extending guide rods 20 connected therewith and slidably received in guides 21 of the frame structure so as to guide the movement of the T rails 19 vertically, as will be described hereafter.

Located on opposite sides of the mandrel 17 are calender rolls 22, the shafts 23 of which are journaled in bearings 24. The bearings 24 are slidably mounted upon side rails 25, capable of movement back and forth relative thereto, whereby the calender rolls 22 may be moved toward and from the peripheral surface of the mandrel 17 and the tube or pipe formed thereon. To provide for this movement, each bearing 24 has a connecting rod 26 attached at one end thereto, while the opposite end is connected with a piston operatively mounted in a cylinder 27 which cylinder is adapted to have a source of liquid supply connected respectively with opposite ends thereof and under sufficient pressure to reciprocate the piston under the control of the operator. The piston and cylinder thus constitute a hydraulic power device for movement of the calender roll 22 back and forth as desired relative to the mandrel from the position shown in full lines in Fig. 1 to the position shown in dotted lines therein. These calender rolls are separated when it is desired to remove a filled mandrel and replace it with an empty one, as will be evident.

Each side rail 25 has guides 28 at opposite ends thereof slidably received on standards 29 for guiding said rail in vertical movement thereof. Each guide rail is moved vertically by piston rods 30 connected therewith adjacent opposite ends thereof, and which piston rods 30 are connected with pistons operatively mounted in cylinders 31. Each cylinder 31 is adapted to be connected on opposite sides of its piston with a source of air or other fluid under pressure to reciprocate the piston under the control of the operator, whereby said piston and cylinder constitute a hydraulic power device for raising or lowering the adjacent end of the side rail 25, as desired.

Each of the piston rods 30 has secured thereto an inwardly projecting arm 32, as shown in Fig. 3, which extends under the adjacent T rail 19, so as to move the latter upward by the power device 31.

It will be apparent from Fig. 1 that the retraction of the calender rolls 22 from the periphery of the mandrel 17 leaves these free for vertical separation in removing the filled mandrel from the machine. To accomplish this, the power devices 31 are operated to move the piston rods 30 upward which first slides the side rails 25 upwardly relative to the standards 29 and carrying the calender rolls 22 upwardly from opposite sides of the mandrel. When the side rails 25 near their upper positions, the arms 32 engage the under edges of the T rails 19 and move these upward sufficiently to lift the opposite ends of the mandrel 17 out of its slotted bearings 18, leaving the mandrel resting on the upper surfaces of the T rails ready for removal from the machine.

The calender rolls 22 are positively driven, each of the shafts 23 being provided with a worm gear thereon meshing with a worm 33 slidably mounted on a shaft 34 and having a key slidably received in a keyway 35 in said shaft, so as to move lengthwise relative thereto while maintaining the driving connection therewith. The worm 33 and its worm gear are enclosed within the housing of bearing 24, so as to be moved bodily upon movement of its calender roll, sliding on the shaft 34 in the movement of the calender rolls from the full line to the dotted line positions in Fig. 1. The shaft 34 has one end journaled in a bearing bracket 36 in which is also journaled a bevel gear 37, meshing with a bevel pinion 38 fixed on the shaft 34. The bevel gear 37 is slidably keyed on a shaft 39 so as to be moved lengthwise relative thereto while maintaining the driving connection therewith for driving the shaft 34 from the shaft 39 in different vertical position of the calender rolls. The bearing bracket 26 is fixed to the side rail 25 to move vertically therewith. The shaft 39 is driven through bevel gearing 40 and sprocket gearing 41 from the screen mold shaft 8. The ratio of this gearing is such that the calender rolls 22 will be driven at the same peripheral speed as the screen mold.

In this way, the tank 1 having been partially filled with an asbestos and cement composition or other fibrous or other materials from which tubes or pipes may be formed, the rotation of the screen mold 7 in this wet mixture as thus provided will cause a layer of the composition to adhere to the periphery of the screen mold and be carried thereby upward into contact with the fabric roll 15. The bearing engagement of the latter against the periphery of the screen mold will cause this layer to be transferred from the screen mold to the fabric roll on which it will be carried around and into contact with the mandrel 17. A bearing engagement of the mandrel 17 against the periphery of the fabric roll 15 again will cause a transfer of the layer from one to the other and it will be wound up on the mandrel while being compacted by the calendar rolls 22.

Where it is desired to form tubes or pipes with bell-shaped ends, the screen mold 7 is formed with a bell-shaped enlargement 7a at one end thereof, coacting with a reduced portion 15a on the periphery of the fabric roll 15, while the mandrel 17 has an enlargement 17a coacting therewith, and the calendar rolls are provided with complementary portions, so as to bear uniformly on the mandrel approximately throughout its length.

In making tubes or pipes of asbestos and cement composition, or other plastic materials with which this apparatus may be used, it is preferred that semi-dry material be applied over successive wet layers and alternate therewith. For this purpose, Fig. 1 shows diagrammatically provision for applying alternate layers of semi-dry or dry materials over the wet layers wound up on the mandrel. Such semi-dry layers may be applied by either or both of the calender rolls 22.

A mandrel has an atomizing tube 42 extending lengthwise thereof for applying sufficient liquid to the surface of the calender roll to maintain said moisture approximately throughout its length. Suspended directly over the calender roll 22 is a tubular apron 43 carried by brackets 44 supported on the bearings 24 for vertical movement with the calender roll, and said apron 43 is sufficiently flexible to move back and forth with the calender roll at its lower end while its upper end slidably receives a channel 45 of a hopper 46. The hopper 46 has a deflector 47 therein into which material is discharged from a second hopper 48 adapted to be maintained substantially full of material. The second hopper 48 has an agitator 49 therein and both of the hoppers 46 and 48 have distributing brushes 50 in the lower ends thereof which are driven from a variable speed motor 51, so as to feed just the proper amount of material downward onto the periphery of the calender roll 22. The material thus fed from the hoppers 46 and 48 is preferably dry or semi-dry and is distributed onto the moistened peripheral surface of the calender roll which in turn applies it to the wet layer adhering to the mandrel, thus building up a semi-dry or dry layer on a moist or wet layer and alternating these until the required thickness is produced on the mandrel. The tandem arrangement of the hoppers provides a more uniform feed than can be obtained with a single hopper alone. Uniformity of flow of the material is obtained also by having the periphery of the calender roll substantially corrugated with shallow circumferential grooves therein as indicated at 52.

After the formation of the tubes to the desired thickness, the calender rolls are separated and raised out of the path of the mandrel when the latter is lifted out of the slotted bearings 18 on the tracks formed by the T rails 19. In this position, the mandrel can be rolled out of the machine fully to the position shown at the right in Fig. 1, where it may be picked up by a monorail traversing hoist designated generally by the numeral 53 and transported to the desired point of storage. At the same time an empty mandrel has been brought to the opposite side of the machine by a corresponding monorail traversing hoist 54 and moved into position on the T rails 19, so that immediately upon the removal of the filled mandrel from its position over the slotted bearings 18 an empty mandrel is moved into said position ready for the return of the parts to their normal operating positions shown in full lines in Fig. 1, which will be accomplished by the reversal of the power devices under the control of the operator. An empty mandrel will thus be brought into position approximately simultaneously with the removal of a filled mandrel whereby there will be very little loss of time in the replacement and this may be accomplished very simply and quickly. Usually the formed pipe or tube is left on the mandrel while it is dried and hardened. This manner of handling the filled mandrels permits them to be transferred without danger of damage or injury to the soft tubes thereon.

Instead of leaving the mandrel in the formed tube until it dries completely, I have made provision whereby the tube or pipe may be dried on a shell and the mandrel returned immediately for reuse which shell is considerably less expensive than the mandrel and its use reduces the number of mandrels that would be necessary for the continuous operation of the machine.

One arrangement of this character is shown in Figs. 7 and 8 in which a mandrel is designated generally by the number 57, having a shell 58 extending thereover and keyed thereto at 59 for rotation. The tube or pipe is designated T and is formed directly on the shell 58. A flanged sleeve 59' abuts against one end of the mandrel when assembled to prevent relative axial movement or displacement therebetween, said sleeve being interposed between the end of the mandrel and the adjacent slotted bearing 18. After the filled mandrel is removed from the machine, the mandrel 57 may be slipped out of the shell 58 and the latter will retain the tube or pipe during the drying or finishing operation while the mandrel is returned for reuse having another shell applied thereto.

A further modified form of mandrel is shown in Fig. 9 and is designated 60 having a longitudinally split shell 61 thereon, the adjacent edges of which have inwardly projecting ribs 62 slidably receiving a locking piece 63, which fits between said ribs and interlocks therewith completing the continuity of the shell on which the tube or pipe T is formed. For smaller sized tubes a slightly modified form of this locking piece and the flanges or ribs on the shell is shown in Figs. 12 to 14, in which the mandrel is designated 64, the shell 65 and the locking piece 66.

Fig. 6 shows a fabric roll corresponding with the roll 15 but having provision for applying suction thereto, as may be desired for relatively small tubes or pipes where these are not of great thickness. Such suction is not essential but where used it has the advantage of increasing the adhesion of the layer in its transfer from the screen mold to the fabric roll and it serves also to speed up production.

This modified form of fabric roll is designated 70 having a peripheral covering of fabric or felt 71 thereover. The interior of the roll 70 is provided with a suction chamber 72 through which a suction pipe 73 extends being connected with a suitable source of suction which will act through radial perforations 74 in the roll 70 to cause adhesion of the layer to the periphery of the fabric 71.

A further modification is shown in Figure 5 having a fabric roll 77 against which a mandrel 78 bears while calender rolls 79 bear against opposite sides of the mandrel. It will be noted that the mandrel 78 is laterally displaced out of vertical alignment with the fabric roll 77. Each of the calender rolls has a doctor blade 80 acting thereon to remove any surplus material therefrom and to keep the surfaces clean.

This arrangement has provision also for keeping the surface of the fabric roll 77 clean for which purpose a water spray 81 is directed against the periphery of the fabric roll 77 along its length and within a tubular housing 82 having semi-rigid flaps 83 bearing against the periphery of the fabric roll 77 to confine the water supply in the housing. A similar housing 84 is arranged therebelow and connected with a source of suction at 85 to remove the surplus water from the periphery of the fabric roll. The housings 82 and 84 are adapted to be adjusted toward and from the periphery of the fabric roll by an adjusting frame 86.

Although the mixture in the tank 1 is initially a wet mixture of cementitious material, the mixture applied to the mandrel to form the tube or pipe preferably contains approximately 85% of solids and 15% of liquid which results in a semi-dry material. This is included in the reference to "plastic material" in the claims.

I claim:

1. In an apparatus for producing pipes, the combination of means for holding and journaling a mandrel to receive plastic material thereon, tracks underlying the journaling means, means for raising the mandrel from its supported position on the tracks out of the holding and journaling means for removal from the machine, a calender roll normally bearing against the mandrel in its forming position, and means for retracting said calender roll out of bearing relative with the mandrel.

2. In an apparatus for producing pipes, the combination of means for mounting a mandrel to receive pipe forming material thereon, tracks underlying said mandrel, said mounting means journaling the mandrel for rotary movement relative to the tracks, and means for moving said tracks bodily upwardly to lift the mandrel out of its receiving position whereby the mandrel may be moved along said tracks and discharged from the apparatus.

3. In an apparatus for producing pipes, the combination of means for mounting a mandrel to receive plastic material thereon for forming a pipe, said mounting means being constructed for movement of the mandrel therefrom, elongated rigid rails underlying said mandrel in its mounted position, and means for elevating said rails to a position above the mounting means for lifting the mandrel therefrom whereby the mandrel may be rolled along said rails and discharged from the apparatus.

4. In an apparatus for producing pipes, the combination of a mandrel, means journaling said mandrel in position to receive plastic material thereon for forming a pipe, elongated rigid rails underlying opposite end portions of the mandrel, means for elevating said rails to a point above the normal position of the mandrel for lifting the mandrel from the mounting means whereby it may be moved along the rails for discharge from the apparatus.

5. In an apparatus for producing pipes, the combination of a mandrel, means mounting said mandrel in a normal position for receiving plastic material thereon to produce a pipe, elongated rigid rails extending transversely of opposite end portions of the mandrel and underlying said portions, and power means for bodily elevating said rails to elevated positions lifting the mandrel from the mounting means to a point where it may be rolled along the rails for discharge from the apparatus at one side thereof while an empty mandrel is rolled along the rails at the opposite side to its forming position.

6. In an apparatus for producing pipes, the combination of a mandrel, means mounting said mandrel in a normal position for receiving plastic material thereon to form a pipe therearound, tracks underlying opposite end portions of said mandrel and extending transversely of the apparatus from side to side thereof, a calender roll normally bearing against said mandrel, and means for moving said calender roll away from the mandrel, said means having a lost-motion connection with the tracks for elevating said tracks and lifting the mandrel out of its normal position whereby it may be moved along the tracks for discharge from the apparatus.

7. In an apparatus for producing pipes, the combination of a mandrel, means mounting said mandrel in a normal position for receiving plastic material therearound to form a pipe therearound, tracks underlying opposite end portions of the mandrel and extending transversely thereof, calender rolls on opposite sides of the mandrel, side rails having opposite end portions of the calender rolls mounted thereon, means for moving said calender rolls bodily toward and from the mandrel, and power means for lifting said side rails to move the calender rolls away from the mandrel.

8. In an apparatus for producing pipes, the combination of a mandrel, means mounting said mandrel in a normal position for receiving plastic material therearound to form a pipe therearound, tracks underlying opposite end portions of the mandrel and extending transversely thereof, calender rolls on opposite sides of the mandrel, side rails having opposite end portions of the calender rolls mounted thereon, means for moving said calender rolls bodily toward and from the mandrel, power means for lifting said side rails to move the calender rolls away from the mandrel, and means actuated by said power means after a predetermined movement thereof for bodily lifting said tracks and raising the mandrel out of its normal position for discharge from the apparatus.

9. In an apparatus for producing pipes, the combination of a mandrel, means mounting said mandrel in a normal position for receiving plastic material therearound to form a pipe therearound, tracks extending transversely of the mandrel and underlying opposite end portions thereof, calender rolls on opposite sides of the mandrel and normally bearing thereagainst, side rails having opposite ends of the calender rolls mounted thereon for bodily movement toward and from the mandrel, power devices connected with opposite end portions of each calender roll for moving the same along the side rails, and power devices connected with opposite end portions of each side rail for lifting the same to elevated positions, said last-mentioned power devices having arms extending in positions to engage under each of the tracks to move said tracks upwardly and lift the mandrel out of its normal position to an elevated position whereby it may be moved along the tracks and discharged from the apparatus.

10. In an apparatus for producing pipes, the combination of a mandrel, means mounting said mandrel in a normal position for receiving plastic material therearound to form a pipe therearound, tracks extending transversely of the mandrel and underlying opposite end portions thereof, calender rolls on opposite sides of the mandrel and normally bearing thereagainst, side rails having opposite ends of the calender rolls mounted thereon for bodily movement toward and from the mandrel, power devices connected with opposite end portions of each calender roll for moving the same along the side rails, power devices connected with opposite end portions of each side rail for lifting the same to elevated positions, said last-mentioned power devices having arms extending in positions to engage under each of the tracks to move said tracks upwardly and lift the mandrel out of its normal position to an elevated position whereby it may be moved along the tracks and discharged from the apparatus, gearing for driving the calender rolls, a drive shaft carried by one of the side rails and having slidable keyed connection with said gearing for maintaining the driving connection with the calender rolls during movement of the latter along the tracks, a second drive shaft, and gearing connecting said second drive shaft with the first-mentioned drive shaft, the last-mentioned gearing having a slidable keyed connection with the second drive shaft for maintaining the driving connection durng the vertical adjustment of the side rails.

11. A pipe forming mandrel comprising a body portion, a longitudinally split sheet metal shell sleeved over said body portion and having disconnected edges, and a locking piece slidable relative to the body portion between said body portion and the shell and having interfitted connection with said edges for holding the shell in place on the body portion to receive plastic material therearound.

12. A pipe forming mandrel comprising a cylindrical body portion having one or more longitudinal recesses in the periphery thereof, a longitudinally split sheet metal shell sleeved over said body portion and having disconnected edges in the recess or recesses, and a locking piece extending lengthwise substantially through the recess or recesses and having interfitting connection with said edges for holding the shell in place on the body portion to receive plastic material thereon.

13. A pipe forming mandrel comprising a body portion, a longitudinally split sheet metal shell sleeved over said body portion and having inturned disconnected edges, and a T-shaped locking piece having a middle portion interposed between the disconnected edges of the shell and clamping inner portions embracing the inturned edges of the shell, said locking piece being slidable lengthwise of the shell for detachably clamping the edges thereof together.

14. In an apparatus for producing pipes, the combination of a mandrel, slotted bearings detachably receiving the mandrel and journaling the same for turning movement, tracks normally beneath the bearings, means for bodily elevating the tracks, and means for lifting the mandrel out of the slotted bearings upon substantial elevating movement of the tracks.

15. In an apparatus for producing pipes, the combination of a calendar roll having a fabric covering thereon, means for spraying washing water against a side of the roll, a housing enclosing said water spray and having the edges thereof substantially in bearing engagement with the periphery of the roll on opposite sides of the spraying means, and suction means acting on the periphery of the roll for extracting moisture from the fibrous material thereof.

JOHN FERLA.